United States Patent
Kwon

(10) Patent No.: US 10,127,098 B2
(45) Date of Patent: Nov. 13, 2018

(54) APPARATUS AND METHOD FOR RECOVERING FUNCTIONALITY OF CENTRAL PROCESSING UNIT CORE

(71) Applicant: ELECTRONICS AND TELECOMMUNICATIONS RESEARCH INSTITUTE, Daejeon (KR)

(72) Inventor: Young-Su Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 168 days.

(21) Appl. No.: 15/008,188

(22) Filed: Jan. 27, 2016

(65) Prior Publication Data

US 2016/0283315 A1    Sep. 29, 2016

(30) Foreign Application Priority Data

Mar. 23, 2015 (KR) .................. 10-2015-0039969

(51) Int. Cl.
 *G06F 11/00* (2006.01)
 *G06F 11/07* (2006.01)

(52) U.S. Cl.
 CPC ...... *G06F 11/0793* (2013.01); *G06F 11/0721* (2013.01)

(58) Field of Classification Search
 CPC .................. G06F 11/0793; G06F 11/0721
 See application file for complete search history.

(56) References Cited

U.S. PATENT DOCUMENTS

| 5,577,220 | A |   | 11/1996 | Combs et al. |
| 5,625,789 | A | * | 4/1997  | Hesson ............. G06F 9/3834 712/217 |
| 5,838,894 | A | * | 11/1998 | Horst ............. G01R 31/31727 709/239 |
| 5,905,857 | A | * | 5/1999  | Buzby ............. G06F 11/1407 714/31 |
| 2005/0015659 | A1 |   | 1/2005 | Pomaranski et al. |
| 2005/0102565 | A1 |   | 5/2005 | Barr et al. |
| 2006/0179207 | A1 | * | 8/2006 | Eisen ............. G06F 9/30043 711/100 |
| 2008/0229145 | A1 | * | 9/2008 | Bose ............. G06F 11/1407 714/10 |

(Continued)

FOREIGN PATENT DOCUMENTS

| JP | H03-009433 A   | 1/1991 |
| KR | 10-1995-0003975 A | 2/1995 |
| KR | 10-2008-0068710 A | 7/2008 |

*Primary Examiner* — Bryce P Bonzo
*Assistant Examiner* — Katherine Lin

(57) ABSTRACT

An apparatus and method for recovering the functionality of central processing unit core are disclosed herein. The apparatus for recovering the functionality of a central processing unit (CPU) core includes a functionality recovery buffer and a functionality recovery module unit. The functionality recovery buffer temporarily stores a value, to be stored in a register storage unit, in response to a write operation. The functionality recovery module unit performs the recovery of functionality by controlling the functionality recovery buffer when receiving a signal, indicating that a failure has been detected, from the outside.

8 Claims, 3 Drawing Sheets

(56) References Cited

U.S. PATENT DOCUMENTS

2009/0044044 A1    2/2009   Harter et al.
2014/0344619 A1   11/2014   Kwon
2014/0344623 A1   11/2014   Han

* cited by examiner

APPARATUS AND METHOD FOR RECOVERING FUNCTIONALITY OF CENTRAL PROCESSING UNIT CORE

CROSS-REFERENCE TO RELATED APPLICATION

This application claims the benefit of Korean Patent Application No. 10-2015-0039969, filed on Mar. 23, 2015, which is hereby incorporated by reference herein in its entirety.

BACKGROUND

1. Technical Field

The present disclosure relates generally to an apparatus and method for recovering the functionality of a central processing unit (CPU) core, and more particularly to an apparatus and method for recovering a CPU core to a safe state when a failure occurs in the CPU core due to an external cause, such as voltage, current, temperature, or the like, during the operation of the CPU core.

2. Description of the Related Art

A CPU core reads instructions from a storage medium, such as memory or a disk, performs a specific operation on an operand, and stores the result of the operation. Accordingly, a CPU core may be considered to be hardware or an IP that executes an algorithm for a specific application.

Central processing units (CPUs) are currently being widely used in all fields involving system semiconductors. The use of CPU cores has been expanded to various applications, including: high-performance media data processing for the processing of a large amount of multimedia data, such as the compression and decompression of video data, the compression and decompression of audio data, the deformation of audio data and sound effects; minimum performance microcontroller platforms for, for example, a wired/wireless communication modem, a voice codec algorithm, the processing of network data, a touch screen, a household electronic appliance controller, and motor control; and devices that cannot be stably supplied with power or cannot be supplied with power from the outside, such as a wireless sensor network and an electronics (smart) dust.

A CPU core is basically composed of a core, a translation lookaside buffer (TLB), and caches. A task that will be performed by a CPU core is stipulated by the combination of a plurality of instructions. That is, instructions are stored in memory, these instructions are sequentially input to the CPU core, and then the CPU core performs a specific operation at each clock cycle. The TLB functions to translate a virtual address into a physical address in order to drive an operating system-based application. The caches function to temporarily store the instructions, stored in the external memory, inside a chip, thereby increasing the speed of the CPU core.

Recently, in automobile systems, driver assistance systems, such as an advanced driver assistance system (ADAS), having high-level intelligence and precision have been actively developed, and thus the importance of electric or electronic device systems has increased.

In particular, it is expected that in order to recognize an environment outside a vehicle on behalf of a driver, applications in which a core having performance higher than the existing 50 to 100 MHz performance, i.e., a 500 MHz or higher performance CPU core, is applied to an automobile system are to increase considerably.

These applications include motion detection in a smart black box, pedestrian recognition during the running of a vehicle, the recognition of a driver's driving pattern or drowsiness, lane detection and driving assistance, etc.

In order to analyze a recognized external environment, a recognized image, a recognized voice and/or the input of a sensor and to be involved in the driving of a vehicle, the function of analyzing a large amount of data in real time using a high-performance CPU core and extracting a result, such as the recognition of a pedestrian, is required. In particular, in the case of lane recognition-based driving assistance, a direct influence may be exerted on a steering apparatus based on the result of recognition during the running of a vehicle. Methods of exerting a direct influence on a vehicle steering apparatus include a method of applying vibration to a steering wheel and a method of limiting the rotating angle of a steering wheel, as methods for notifying a driver of the result of lane recognition.

The importance of the function of identifying the reliability of a CPU core, i.e., a case in which a CPU core does not normally operate, is critical, particularly in applications that can recognize data outside a vehicle and exert a direct influence on the steering apparatus of the vehicle. The reason for this is that in the case in which a high-performance recognition result can exert a direct influence on a steering apparatus, when a semiconductor erroneously operates due to a cause, such as voltage, current, temperature, or the like, a direct influence may be exerted on a driver's life. Even in this high-performance CPU core, the result of the operation of a CPU core may exert an influence on steering, and thus the guarantee of the reliability of the operation of the CPU core, i.e., the guarantee of the operation of the CPU core that is performed according to an intended function, may be considered to be important.

The support of the functional safety of a semiconductor circuit means that when a fault that was not intended during the design of a circuit occurs in the circuit due to a certain external cause, the occurrence of a failure can be detected and the recovery of functionality can be performed. ISO 26262 assigns Automotive Safety Integrity Level (ASIL) classes according to circuit characteristics that can manage failures occurring in automobile semiconductor circuits as a standard for the design of the functional safety of automobile electric and electronic device systems which is defined by ISO TC22/SC3/WG16.

The fault that is not intended during the operation of a circuit refers to a phenomenon in which an external cause, i.e., particles, such as cosmic rays, newtons or muons, are accumulated in a semiconductor circuit and generate a bit-flip at an unspecific time. The lifetime of a bit-flip is known to generally range from 100 ps to 5 ns, and thus a normal state is recovered after the passage of a predetermined time. However, if a fault occurs in a storage device, i.e., a register file or a memory device, this value is continuously maintained, and thus causes a failure in a circuit. This leads to a failure in an overall system depending on the characteristics of the circuit and the location of the occurrence of the failure in the circuit, and thus acts as a risk factor that may cause a deadly accident.

The preceding technology related to the present invention includes U.S. Patent Application No. 2005-0102565 entitled "Fault-tolerant Multi-core Microprocessing" and U.S. Patent Application No. 2005-0015659 entitled "Targeted Fault Tolerance by Special CPU Instructions."

SUMMARY

At least some embodiments of the present invention are directed to the provision of an apparatus and method that are capable of recovering functionality by recovering a register file within a CPU core to a previous safe state when a failure occurs due to the erroneous operation of a circuit within the CPU core, attributable to an external cause, such as voltage, current, temperature or the like, during the operation of the CPU core and then the failure is detected.

In accordance with an aspect of the present invention, there is provided an apparatus for recovering the functionality of a central processing unit (CPU) core, including: a functionality recovery buffer configured to temporarily store a value, to be stored in a register storage unit, in response to a write operation; and a functionality recovery module unit configured to perform the recovery of functionality by controlling the functionality recovery buffer when receiving a signal, indicating that a failure has been detected, from the outside.

The functionality recovery buffer may include a plurality of functionality recovery buffer elements that are connected in series.

The plurality of functionality recovery buffer elements may operate according to a First-In, First-Out (FIFO) method whenever the register write operation occurs.

Each of the plurality of functionality recovery buffer elements may include: a first sub element configured to indicate whether the corresponding functionality recovery buffer element is valid; a second sub element configured to store a memory address where an instruction having performed the register write operation is located; a third sub element configured to store the ID of a destination register, on which a write operation will be performed, during the register write operation; a fourth sub element configured to store the value of the register during the register write operation; and a fifth sub element configured to store the output of an error correction code (ECC) generation unit for the value of the register during the register write operation.

The functionality recovery module unit, when receiving the signal, indicating that a failure has been detected, from the outside, may output a signal, indicating that recovery of functionality is performed, may output the value of the second sub element of the final element of the plurality of functionality recovery buffer elements, may cause the plurality of functionality recovery buffer elements to enter an invalid state in order to perform the recovery of functionality, and may output a signal, indicating that the recovery of functionality has been completed, when the recovery of functionality is completed.

The functionality recovery module unit, if the value of the second sub element of the final element of the plurality of functionality recovery buffer elements is not "1," may sequentially search second sub elements of the immediately previous functionality recovery buffer elements, and may output the value of a second sub element set to "1."

The output value of the second sub element may become the start address of a program sequence that the CPU core will execute after the recovery of functionality.

The functionality recovery module unit may cause the plurality of functionality recovery buffer elements to enter an invalid state by setting the first sub elements of all of the plurality of functionality recovery buffer elements to "0."

The apparatus may further include a register reading module unit configured to receive the outputs of the plurality of functionality recovery buffer elements and the outputs of all register elements within the register storage unit, and to select a value, to be read, from the outputs.

The register reading module unit, if the ID of a register to be read is present both in any one of the plurality of functionality recovery buffer elements and any one of all the register elements, may referentially select the value of the any one of the functionality recovery buffer elements.

The register reading module unit may include an ECC generation and comparison unit configured to compare an ECC value, generated from the fourth sub element of the selected functionality recovery buffer element, with the value of the fifth sub element of the selected functionality recovery buffer element, and to provide notification of whether a failure has occurred to the outside.

In accordance with an aspect of the present invention, there is provided a method of recovering the functionality of a CPU core, including: receiving, by a functionality recovery module unit, a signal, indicating that a failure has been detected, from the outside; and performing, by the functionality recovery module unit, the recovery of functionality by controlling a functionality recovery buffer configured to temporarily store a value, to be stored in a register storage unit, in response to a write operation.

The functionality recovery buffer may include a plurality of functionality recovery buffer elements, each including a first sub element configured to indicate whether the corresponding functionality recovery buffer element is valid and a second sub element configured to store a memory address where an instruction having performed the register write operation is located; and performing the recovery of functionality includes outputting the value of the second sub element of the final element of the plurality of functionality recovery buffer elements, causing the plurality of functionality recovery buffer elements to enter an invalid state in order to perform the recovery of functionality, and outputting a signal, indicating that the recovery of functionality has been completed, when the recovery of functionality is completed.

Outputting the value of the second sub element of the final element of the plurality of functionality recovery buffer elements may include, if the value of the second sub element of the final element of the plurality of functionality recovery buffer elements is not "1," sequentially searching second sub elements of the immediately previous functionality recovery buffer elements, and outputting a value of a second sub element set to "1."

The output value of the second sub element may become the start address of a program sequence that the CPU core will execute after the recovery of functionality.

Causing the plurality of functionality recovery buffer elements to enter an invalid state in order to perform the recovery of functionality may include causing the plurality of functionality recovery buffer elements to enter an invalid state by setting the first sub elements of all of the plurality of functionality recovery buffer elements to "0."

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
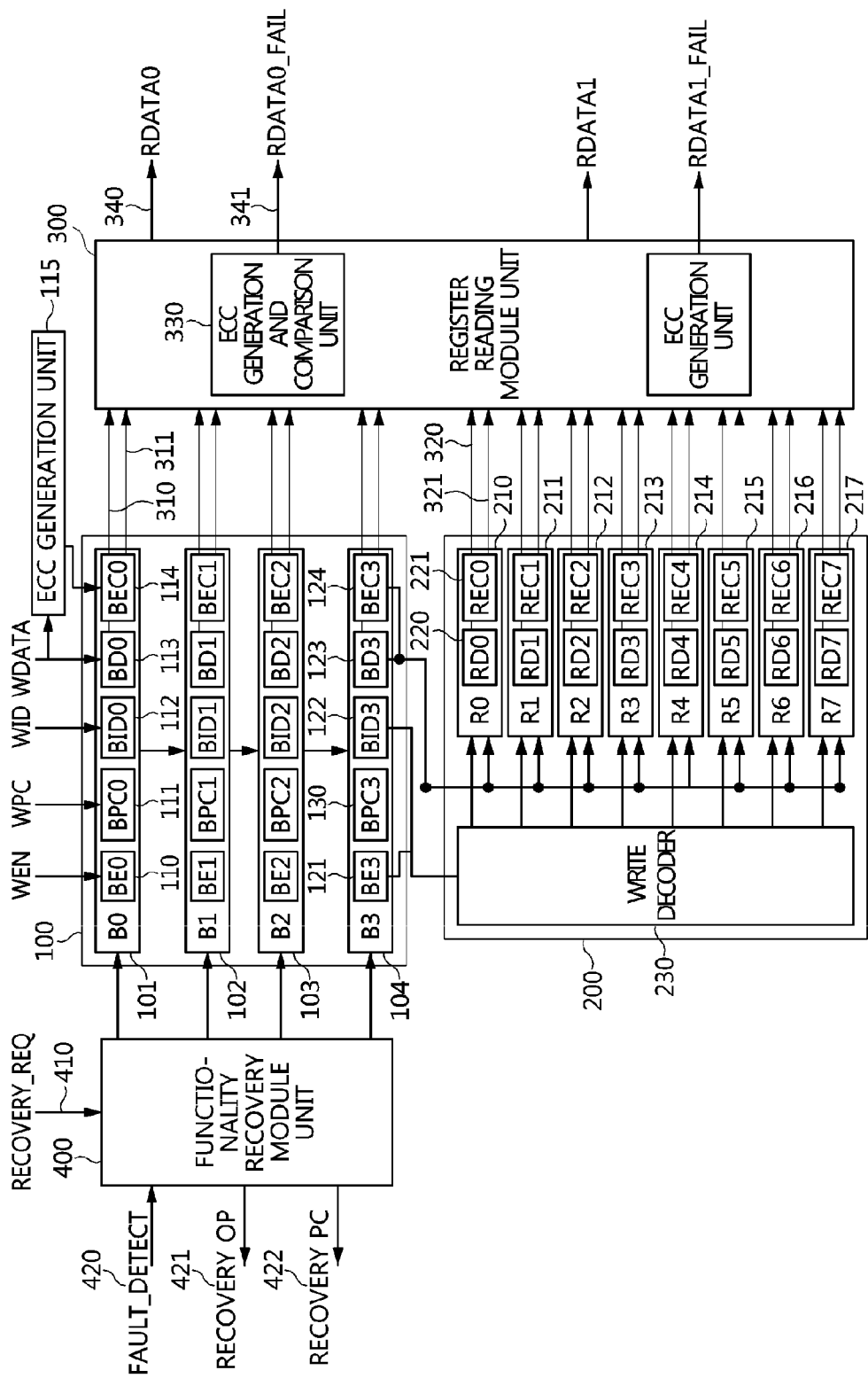
FIG. 1 is a diagram showing the configuration of an apparatus for recovering the functionality of a CPU core according to an embodiment of the present invention.

The present invention may be modified in various ways and have various embodiments. Specific embodiments are illustrated in the drawings and described in detail below.

However, it should be understood that the present invention is not intended to be limited to these specific embodiments but is intended to encompass all modifications, equivalents and substitutions that fall within the technical spirit and scope of the present invention.

The terms used herein are used merely to describe embodiments, and are not used to limit the present invention. A singular form may include a plural form unless otherwise defined. The terms, including "comprise," "includes," "comprising," "including" and their derivatives, specify the presence of described shapes, numbers, steps, operations, elements, parts and/or groups thereof, and do not exclude the possibility of the presence or addition of one or more other shapes, numbers, steps, operations, elements, parts, and/or groups thereof.

Unless otherwise defined herein, all terms including technical or scientific terms used herein have the same meanings as commonly understood by those skilled in the art to which the present invention pertains. It will be further understood that terms, such as those defined in commonly used dictionaries, should be interpreted as having meanings that are consistent with their meanings in the context of the specification and relevant art and should not be interpreted in an idealized or overly formal sense unless expressly so defined herein.

Embodiments of the present invention are described in greater detail below with reference to the accompanying drawings. In order to facilitate the general understanding of the present invention, like reference numerals are assigned to like components throughout the drawings and redundant descriptions of the like components are omitted.

Generally, a CPU core includes a pipeline part configured to execute the functions of instructions and a register file (a set of register elements) configured to read the results (operand values) of the operations of instructions. When an instruction is input to the pipeline part (i.e., logic for executing the function of an instruction) of the CPU core, a result value is stored in the register file after predetermined clock cycles. Since instructions are sequentially and successively input, the operation of writing a value to a register file is successively performed every clock cycle.

An apparatus and method in which a functionality recovery buffer is implemented to recover the functionality of a register file and the recovery of functionality is performed to recover the register file to a previous safe state via the functionality recovery buffer when a failure occurs and is detected in a CPU core will be described below.

FIG. 1 is a diagram showing the configuration of an apparatus for recovering the functionality of a CPU core according to an embodiment of the present invention.

The apparatus for recovering the functionality of a CPU core according to the present embodiment of the present invention includes a functionality recovery buffer 100, a register storage unit 200, a register reading module unit 300, and a functionality recovery module unit 400.

The functionality recovery buffer 100 prevents a value having a fault from being stored in a register element of the register storage unit 200 under the control of the functionality recovery module unit 400 when the fault occurs in a pipeline within a CPU core.

The functionality recovery buffer 100 includes a plurality of functionality recovery buffer elements 101, 102, 103 and 104. The functionality recovery buffer elements 101, 102, 103 and 104 are connected in series. Whenever a register write operation occurs, the values of the functionality recovery buffer element are moved according to a First-In, First-Out (FIFO) method. For example, whenever a register write operation occurs, the value of the first functionality recovery buffer element 101 is moved to the second functionality recovery buffer element 102, the value of the second functionality recovery buffer element 102 is moved to the third functionality recovery buffer element 103, and the value of the third functionality recovery buffer element 103 is moved to the fourth functionality recovery buffer element 104.

A register write operation is processed by the first functionality recovery buffer element 101. The sub element BE0 110 of the functionality recovery buffer element 101 is a flip-flop indicating that the corresponding functionality recovery buffer element 101 is valid, i.e., that data has been stored. The sub element BPC0 111 of the functionality recovery buffer element 101 stores a memory address (for example, a program counter (PC)) where an instruction having performed a register write operation is located. The functionality recovery buffer element 101 of the sub element BID0 112 stores the identification number (ID) of a register (i.e., a destination register) on which a write operation is to be performed during a register write operation. The sub element BD0 113 of the functionality recovery buffer element 101 stores the value of a register during a register write operation. The sub element BEC0 114 of the functionality recovery buffer element 101 stores the output of an error correction code (ECC) generation unit 115 that generates ECC for the value of a register during a register write operation.

The other functionality recovery buffer elements 102, 103 and 104 of the functionality recovery buffer 100 include the same sub elements as the above-described functionality recovery buffer element 101.

The final functionality recovery buffer element 104 of the functionality recovery buffer 100 commits a value, stored in the corresponding functionality recovery buffer element, to a register element (i.e., a register file) of the register storage unit 200 when a register write operation occurs.

The register storage unit 200 stores the result of a register write operation that is performed by the functionality recovery buffer 100.

The register storage unit 200 includes a write decoder 230 and a plurality of register elements 210, 211, 212, 213, 214, 215, 216 and 217. Each of the register elements 210, 211, 212, 213, 214, 215, 216 and 217 includes register data 220 and a register ECC 221.

The write decoder 230 enables any one of the plurality of register elements 210, 211, 212, 213, 214, 215, 216 and 217 and performs a write operation based on a value stored in the final functionality recovery buffer element 104 of the functionality recovery buffer 100. For example, since the fact that the sub element BE3 121 of the functionality recovery buffer element 104 is "1" means that there is a value to be written in a register file, the write decoder 230 performs a write operation when the sub element BE3 121 is "1." The write decoder 230 identifies a register to be written to based on the value of the sub element BID3 122, and enables a corresponding one of the plurality of register elements 210, 211, 212, 213, 214, 215, 216 and 217. Furthermore, the write decoder 230 stores the values of the sub element BD3 123 and the sub element BEC3 124 in the enabled register element.

The register reading module unit 300 includes an ECC generation and comparison unit 330.

The register reading module unit 300 receives the outputs 310 and 311 of all the functionality recovery buffer elements 101, 102, 103 and 104 within the functionality recovery buffer 100 and the outputs 320 and 321 of all the register elements 210, 211, 212, 213, 214, 215, 216 and 217 within the register storage unit 200 as input, and selects a value to be read from the received outputs. In FIG. 1, the register reading module unit 300 may simultaneously read two registers.

If the ID of a register to be read is present both in a functionality recovery buffer element (i.e., any one of the plurality of functionality recovery buffer elements) and a register element (i.e., any one of the plurality of register elements), the register reading module unit 300 may preferentially select the value of the functionality recovery buffer element. For example, when ID=3 and BD1=3 with respect to a register that the register reading module unit 300 desires to read, the register reading module unit 300 selects a value read from BD1. In this case, the value of BD1 is input to the ECC generation and comparison unit 330.

The ECC generation and comparison unit 330 compares the value of an ECC generated from BD1 with the value of BEC1. If the values are different, the ECC generation and comparison unit 330 sets RDATA0_FAIL 341 to "1," and thus notifies the outside that a failure has occurred in data stored in the functionality recovery buffer element. In contrast, if the values are not different, the ECC generation and comparison unit 330 outputs the value of BD1 to RDATA0 340.

When a signal FAULT_DETECT 420, indicating that a failure has been detected, is input from the outside, the functionality recovery module unit 400 sets a signal output RECOVERY_OP 421, indicating that the recovery of functionality is performed, to "1."

The functionality recovery module unit 400 outputs the value of the sub element BPC3 130 of the final element 104 within the functionality recovery buffer 100 to RECOVERY_PC 422 immediately before performing the recovery of functionality. If the value of the sub element BE3 121 of the final element 104 within the functionality recovery buffer 100 is not "1," the functionality recovery module unit 400 performs search in the sequence of the sub elements BE2, BE1 and BE0, and outputs the value of the BPC of the functionality recovery buffer element set to "1" to RECOVERY_PC 422. In this case, the output value of the final PC of the functionality recovery buffer element (for example, the value of the sub element BPC3 130) becomes the start address of a program sequence that a CPU core executes after the recovery of functionality.

Furthermore, the functionality recovery module unit 400 performs the recovery of functionality by setting the BE of all the functionality recovery buffer elements to "0." That is, while the recovery of functionality is being performed, all the functionality recovery buffer elements 101, 102, 103 and 104 enter an "invalid" state.

Once the recovery of functionality has been completed, the functionality recovery module unit 400 sets RECOVERY_OP 421 to "0."

The detection of a failure is not performed immediately after a failure has occurred. Generally, the time corresponding to a maximum of N cycles is required until a fault occurs, is converted into a failure and is detected. FIG. 1 illustrates a case in which the number of functionality recovery buffer elements 101, 102, 103 and 104 is N=4.

Due to the presence of the functionality recovery buffer element, the result of a register write operation is not immediately committed to the register storage unit 200, and is temporarily stored in the functionality recovery buffer elements.

Furthermore, if a fault occurs, all the functionality recovery buffer elements are set to an "invalid" state by the functionality recovery module unit 400. The operation of setting all the functionality recovery buffer elements to an "invalid" state when a fault occurs as described above is the recovery of functionality. In greater detail, in order to perform the recovery of functionality, the functionality recovery module unit 400 sets all BE0 to BE3 of the functionality recovery buffer elements to "0." This completes the recovery of functionality, and thus the register storage unit 200 maintains the state in which it is determined that there is no failure.

In FIG. 1, reference symbol 410 designates a recovery request signal RECOVERY_REQ that is input from the outside to the functionality recovery module unit 400. Accordingly, when a signal FAULT_DETECT 420, indicating that a failure has been detected, or a recovery request signal RECOVERY_REQ 410 is input from the outside, the functionality recovery module unit 400 may set a signal output RECOVERY_OP 421, indicating that the recovery of functionality is performed, to "1."

As a result, in FIG. 1, it may be understood that the functionality recovery buffer 100 temporarily stores a value, to be stored in the register storage unit 200, in response to a write operation and the functionality recovery module unit 400 performs the recovery of functionality by controlling the functionality recovery buffer 100 in response to the reception of a signal, indicating that a failure has been detected, from the outside.

Figure 2:
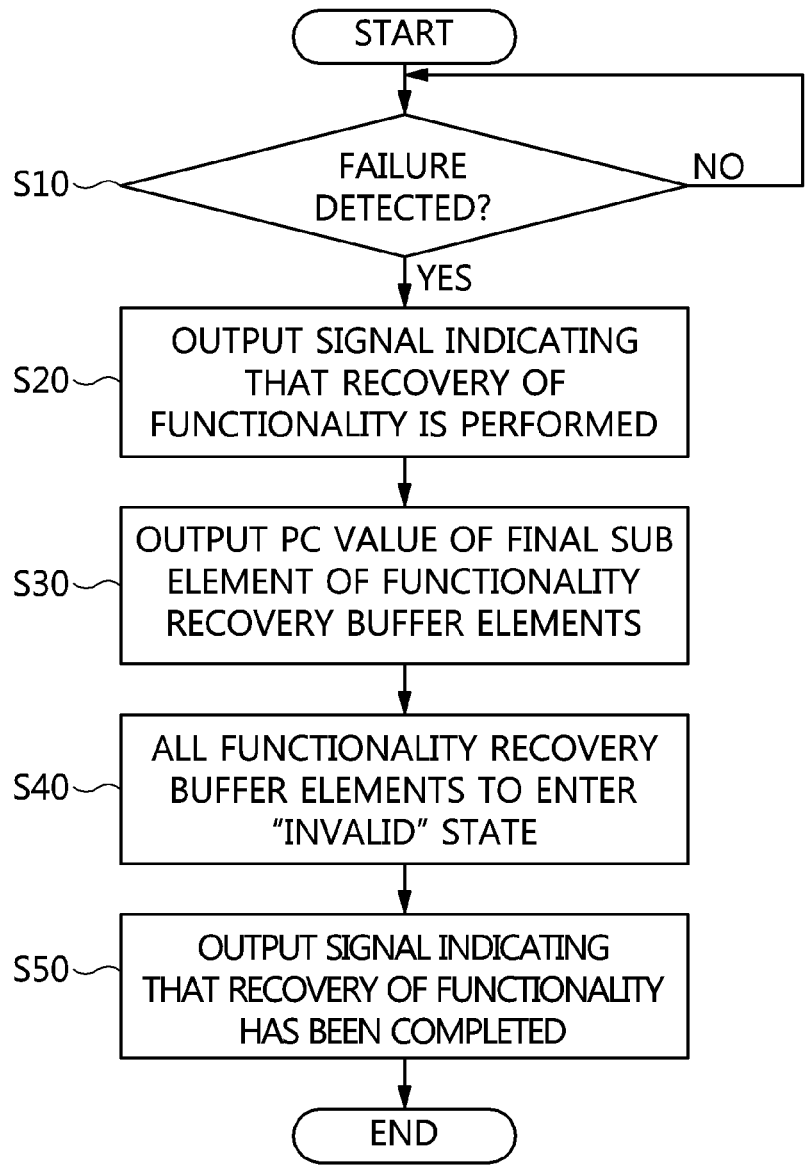
FIG. 2 is a flowchart showing the operation of an apparatus for recovering the functionality of a CPU core according to an embodiment of the present invention.

FIG. 2 is a flowchart showing the operation of an apparatus for recovering the functionality of a CPU core according to an embodiment of the present invention.

For example, it is assumed that a CPU core executes an instruction, such as "0x2000_003c: ADD % g1, % g2, % g3; g1=0x0000_0012, g2=0x0000_011f."

The sub element BE0 110 of the first functionality recovery buffer element 101 of the functionality recovery buffer 100 becomes "1," the sub element BPC0 111 becomes "0x2000_003c," the sub element BID0 112 becomes "3 (a write operation is performed on g3)," and the sub element BD0 113 becomes "0x0000_0131." The sub element BEC0 114 stores a value, obtained by ECC encoding BD0, according to the complexity of implementation of an ECC.

Thereafter, whenever a register write operation occurs, a value stored in the functionality recovery buffer element 101 is moved to the functionality recovery buffer element 102, a value stored in the functionality recovery buffer element 102 is moved to the functionality recovery buffer element 103, and a value stored in functionality recovery buffer element 103 is moved to the functionality recovery buffer element 104.

The detection of a failure is not performed immediately after a failure has occurred. Generally, the time corresponding to a maximum of N cycles is required until a fault occurs, is converted into a failure and is detected. FIG. 1 illustrates a case in which the number of functionality recovery buffer elements 101, 102, 103 and 104 is N=4.

Due to the presence of the functionality recovery buffer element, the result of a register write operation is not immediately committed to the register storage unit 200, and is temporarily stored in the functionality recovery buffer elements.

As described above, due to the presence of the functionality recovery buffer elements 101, 102, 103 and 104, the result of a register write operation is not immediately committed to the register storage unit 200, and is sequentially and temporarily stored in the functionality recovery buffer elements 101, 102, 103 and 104.

During this register write operation, if the signal FAULT_DETECT 420, indicating that a failure has been detected, is input to the functionality recovery module unit 400 from the outside ("Yes" at step S10), the functionality recovery module unit 400 sets the signal output RECOVERY_OP 421, indicating that the recovery of functionality is performed, to "1" at step S20.

Thereafter, the functionality recovery module unit 400 outputs the value (PC) of the sub element BPC3 130 of the final element 104 to RECOVERY_PC 422 immediately before performing the recovery of functionality at step S30. If the value of the sub element BE3 121 is not "1," the functionality recovery module unit 400 performs search in the sequence of the sub elements BE2, BE1 and BE0, and outputs the value of the BPC of the functionality recovery buffer element set to "1" to RECOVERY_PC 422. In this case, the reason why the value (for example, the value of the sub element BPC3 130) of the final PC of the functionality recovery buffer element is output to RECOVERY_PC 422 is to allow the start address of a program sequence, which the CPU core will execute after the recovery of functionality, to become the value of the final PC of the functionality recovery buffer element. When the CPU core executes an operation from the corresponding PC value, the recovery of functionality will be completed.

Furthermore, the functionality recovery module unit 400 sets BE0 to BE3 of all the functionality recovery buffer elements to "0" in order to perform the recovery of functionality at step S40. That is, all the functionality recovery buffer elements are set to an "invalid" state.

Once the recovery of functionality has been completed, the functionality recovery module unit 400 outputs a signal indicating that the recovery of functionality has been completed at step S50. That is, the functionality recovery module unit 400 sets RECOVERY_OP 421 to "0" once the recovery of functionality has been completed.

Figure 3:
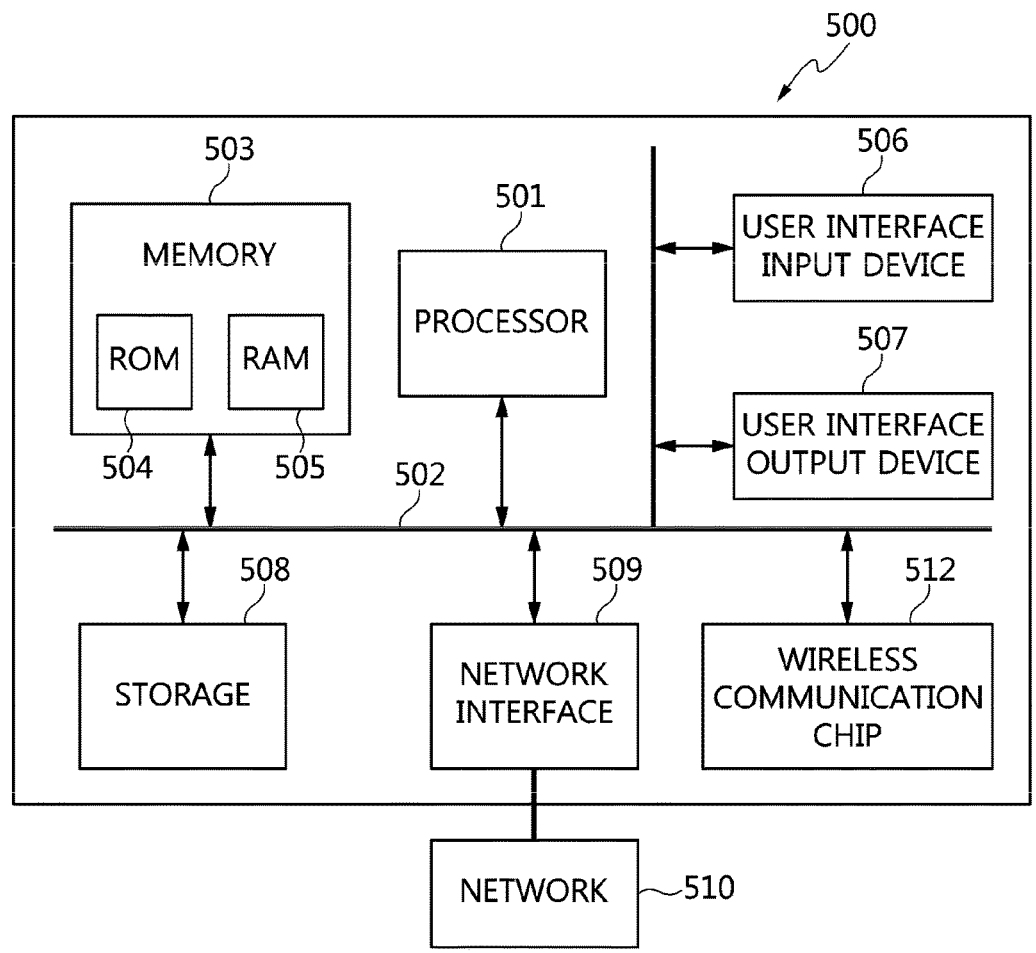
FIG. 3 is a diagram showing a computer system in which an embodiment of the present invention is implemented.

Meanwhile, the above-described embodiments of the present invention may be implemented in a computer system 500. As shown in FIG. 3, the computer system 500 may include at least one processor 501, memory 503, a user interface input device 506, a user interface output device 507, and storage 508 that communicate with one another over a bus 502. Furthermore, the computer system 500 may further include at least one network interface 509 that is connected to a network 510. The processor 501 is a semiconductor device that executes processing instructions stored in a central processing unit, the memory 503 or the storage 508. The memory 503 and the storage 508 may be various types of volatile or nonvolatile storage media. For example, the memory 503 may include ROM 504 or RAM 505.

Furthermore, in the case in which the computer system 500 is implemented as a small-sized computing device in order to prepare for the IoT era, when an Ethernet cable is connected to a computing device, the computing device may operate as a wireless router, and thus a mobile device may be wirelessly coupled to a gateway and perform encryption and decryption functions. For this purpose, the computer system 500 may further include a wireless communication chip (a WiFi chip) 512.

Accordingly, the embodiments of the present invention are implemented as computer-implemented methods or as non-transient computer-readable media in which computer-executable instructions are recorded. When computer-readable instructions are executed by the processor, the computer-readable instructions may perform a method according to at least one aspect of the present invention.

According to the present invention configured as described above, the occurrence of an electrical fault, attributable to a cause, such as voltage, current, temperature or the like, in a CPU core is detected using two cores, a failure can be recovered, and the probability that a failure occurs again during the recovery of functionality can be minimized.

In particular, in prepare for the case in which a failure is detected in a CPU core, the functionality recovery buffer is implemented to perform the recovery of the functionality of a register file, through which the register file can be recovered to a failure-free state even when a failure occurs.

As described above, the exemplary embodiments have been disclosed in the present specification and the accompanying drawings. Although the specific terms have been used herein, they have been used merely for the purpose of describing the present invention, but have not been used to restrict the meanings thereof or limit the scope of the present invention set forth in the attached claims. Accordingly, it will be appreciated by those having ordinary knowledge in the relevant technical field that various modifications and other equivalent embodiments can be made. Therefore, the true range of protection of the present invention should be defined based on the technical spirit of the attached claims.

What is claimed is:

1. An apparatus for recovering functionality of a central processing unit (CPU) core, comprising:
    a functionality recovery buffer configured to temporarily store a value, to be stored in a register storage unit, in response to a write operation;
    a functionality recovery module unit configured to perform recovery of functionality by controlling the functionality recovery buffer when receiving a detect signal, the detect signal indicating that a failure has been detected, from an outside, wherein the functionality recovery buffer comprises a plurality of functionality recovery buffer elements that are connected in series, wherein the plurality of functionality recovery buffer elements operates according to a First-In, First-Out (FIFO) method in response to the write operation; and
    a register reading module unit configured to receive respective outputs of the plurality of functionality recovery buffer elements and to receive respective outputs of register elements within the register storage unit, and to select a value, to be read, from the received outputs.

2. The apparatus of claim 1, wherein each of the plurality of functionality recovery buffer elements comprises:
    a first sub element configured to indicate whether the corresponding functionality recovery buffer element is valid;
    a second sub element configured to store a memory address where an instruction having performed the register write operation is located;
    a third sub element configured to store an ID of a destination register, on which a write operation will be performed, during the register write operation;
    a fourth sub element configured to store a value of the register during the register write operation; and
    a fifth sub element configured to store an output of an error correction code (ECC) generation unit for the value of the register during the register write operation.

3. The apparatus of claim 2, wherein the functionality recovery module unit, when receiving the detect signal, indicating that a failure has been detected, from the outside, outputs a signal, indicating that recovery of functionality is performed, outputs a value of a second sub element of a final element of the plurality of functionality recovery buffer elements, causes the plurality of functionality recovery buffer elements to enter an invalid state in order to perform the recovery of functionality, and outputs a signal, indicating that the recovery of functionality has been completed, when the recovery of functionality is completed.

4. The apparatus of claim 3, wherein the functionality recovery module unit, if the value of the second sub element of the final element of the plurality of functionality recovery buffer elements is not 1, sequentially searches second sub elements of the immediately previous functionality recovery buffer elements, and outputs a value of a second sub element set to 1.

5. The apparatus of claim 4, wherein the output value of the second sub element becomes a start address of a program sequence that the CPU core will execute after the recovery of functionality.

6. The apparatus of claim 3, wherein the functionality recovery module unit causes the plurality of functionality recovery buffer elements to enter an invalid state by setting first sub elements of all of the plurality of functionality recovery buffer elements to 0.

7. The apparatus of claim 1, wherein the register reading module unit, if an ID of a register to be read is present both in any one of the plurality of functionality recovery buffer elements and any one of all the register elements, referentially selects a value of the any one of the functionality recovery buffer elements.

8. The apparatus of claim 7, wherein the register reading module unit comprises an ECC generation and comparison unit configured to compare an ECC value, generated from a fourth sub element of the selected functionality recovery buffer element, with a value of a fifth sub element of the selected functionality recovery buffer element, and to provide notification of whether a failure has occurred to the outside.

\* \* \* \* \*